(12) United States Patent
Roger et al.

(10) Patent No.: US 11,422,249 B2
(45) Date of Patent: Aug. 23, 2022

(54) RADAR DEVICE AND METHOD FOR DETECTING RADAR TARGETS

(71) Applicant: Infineon Technologies AG, Neubiberg (DE)

(72) Inventors: Andre Roger, Munich (DE); Farhan Bin Khalid, Munich (DE); Paul Meissner, Feldkirchen bei Graz (AT); Dian Tresna Nugraha, Bandung (ID); Romain Ygnace, Brunnthal (DE)

(73) Assignee: Infineon Technologies AG

( * ) Notice: Subject to any disclaimer, the term of this patent is extended or adjusted under 35 U.S.C. 154(b) by 209 days.

(21) Appl. No.: 16/855,174

(22) Filed: Apr. 22, 2020

(65) Prior Publication Data
US 2020/0341134 A1    Oct. 29, 2020

(30) Foreign Application Priority Data

Apr. 26, 2019  (DE) .......................... 102019110861.6
Mar. 20, 2020  (DE) .......................... 102020107804.8

(51) Int. Cl.
*G01S 13/58*    (2006.01)
*G01S 7/35*    (2006.01)
(Continued)

(52) U.S. Cl.
CPC ............ *G01S 13/584* (2013.01); *G01S 7/003* (2013.01); *G01S 7/352* (2013.01); *G01S 7/356* (2021.05); *G01S 13/931* (2013.01)

(58) Field of Classification Search
CPC ........ G01S 13/584; G01S 7/003; G01S 7/352; G01S 7/356; G01S 13/931
(Continued)

(56) References Cited

U.S. PATENT DOCUMENTS 4,347,618 A * 8/1982 Kavouras ................ G01S 7/003
                                                          375/259
5,283,422 A * 2/1994 Storch ..................... G06K 7/14
                                                          235/375

(Continued)

FOREIGN PATENT DOCUMENTS

CN    106461775 A  *  2/2017  ........... G01S 13/887
EP    2893370 B1  *  4/2019  ............ B60R 19/03
WO    WO-2008094172 A2  *  8/2008  ............ G01S 13/34

*Primary Examiner* — Bernarr E Gregory
*Assistant Examiner* — Nuzhat Pervin
(74) *Attorney, Agent, or Firm* — Design IP

(57) ABSTRACT

The present disclosure relates to a radar device including a first radar-IC for processing first receive signals from first antennas of an antenna array, wherein the first radar-IC is configured to determine a first range-Doppler map based on the first receive signals, and to determine a first subregion of the first range-Doppler map based on criteria of interest. The radar device also includes at least a second radar-IC for processing second receive signals from second antennas of the antenna array, wherein the second radar-IC is configured to determine a second range-Doppler map based on the second receive signals, and to determine a second subregion of the second range-Doppler map based on the criteria of interest. A data interface is configured to forward information indicative of the first and/or the second subregions to a common processor for further processing.

28 Claims, 13 Drawing Sheets

(51) Int. Cl.
*G01S 7/00* (2006.01)
*G01S 13/931* (2020.01)

(58) Field of Classification Search
USPC .......................................................... 342/109
See application file for complete search history.

(56) References Cited

U.S. PATENT DOCUMENTS

| | | | | |
|---|---|---|---|---|
| 7,382,310 | B1* | 6/2008 | Piesinger | G01S 13/536 |
| | | | | 342/134 |
| 9,131,224 | B1* | 9/2015 | Freeman | G01N 21/8851 |
| 9,134,398 | B2* | 9/2015 | Dupray | G01S 5/0009 |
| 9,483,839 | B1* | 11/2016 | Kwon | G01S 13/865 |
| 9,638,829 | B2* | 5/2017 | Davoodi | G08C 19/00 |
| 9,645,228 | B1* | 5/2017 | Doerry | G01S 13/0209 |
| 9,726,756 | B2* | 8/2017 | Jansen | G01S 13/02 |
| 10,067,507 | B2* | 9/2018 | Davoodi | B63B 22/22 |
| 10,222,178 | B1* | 3/2019 | Hunter, Jr. | F41G 7/2246 |
| 10,775,498 | B2* | 9/2020 | Vacanti | G01S 13/4472 |
| 10,794,992 | B2* | 10/2020 | Farmer | G01S 13/60 |
| 2008/0106460 | A1* | 5/2008 | Kurtz | G01S 13/34 |
| | | | | 342/99 |
| 2011/0140952 | A1* | 6/2011 | Kemkemian | G01S 13/426 |
| | | | | 342/146 |
| 2015/0153445 | A1* | 6/2015 | Jansen | G01S 13/003 |
| | | | | 342/195 |
| 2015/0346323 | A1* | 12/2015 | Kollmer | G01S 7/4021 |
| | | | | 342/196 |
| 2016/0018511 | A1* | 1/2016 | Nayyar | G01S 7/03 |
| | | | | 342/27 |
| 2016/0033631 | A1* | 2/2016 | Searcy | G01S 7/354 |
| | | | | 342/132 |
| 2016/0154092 | A1* | 6/2016 | Pavao-Moreira | G01S 13/345 |
| | | | | 342/175 |
| 2016/0266239 | A1* | 9/2016 | Pavao-Moreira | G01S 13/34 |
| 2018/0172813 | A1* | 6/2018 | Rao | G06F 17/142 |
| 2018/0259641 | A1* | 9/2018 | Vacanti | G01S 13/4463 |
| 2018/0262283 | A1* | 9/2018 | Guarin Aristizabal | |
| | | | | H04B 17/345 |
| 2019/0064338 | A1* | 2/2019 | Holt | H01Q 1/525 |
| 2019/0075710 | A1* | 3/2019 | Strnad | A01C 7/203 |
| 2019/0178983 | A1* | 6/2019 | Lin | G01S 13/003 |
| 2019/0187273 | A1* | 6/2019 | Tong | G01S 13/878 |
| 2019/0204846 | A1* | 7/2019 | Reuter | G01S 7/03 |
| 2020/0064445 | A1* | 2/2020 | Amihood | G06F 1/3275 |
| 2020/0300995 | A1* | 9/2020 | Wu | G01S 7/41 |

* cited by examiner

RADAR DEVICE AND METHOD FOR DETECTING RADAR TARGETS

FIELD

The present disclosure relates to radar systems and, more particularly, to radar concepts using signal processing techniques distributed among a plurality of integrated radar circuits.

BACKGROUND

Automotive radars, along with other environmental sensors such as lidar, ultrasound, and cameras, are one of the backbones of self-driving cars and advanced driver assistant systems (ADASs). These technological advancements are enabled by complex systems with signal processing paths from radars/sensors to one or more controllers. Automotive radar systems enable the detection of objects and obstacles, their position, and speed relative to a vehicle. The development of signal processing techniques along with progress in the millimeter-wave (mm-wave) semiconductor technology plays a key role in automotive radar systems. Various signal processing techniques have been developed to provide better resolution and estimation performance in all measurement dimensions: range, azimuth-elevation angles, and velocity of the targets surrounding the vehicles.

For frequency-modulated continuous-wave (FMCW) radar systems, for example, it is known to obtain information on range, speed, and angles by performing multiple Fast Fourier Transforms (FFTs) on samples of radar mixer outputs. A first FFT, also commonly referred to as range FFT, yields range information. A second FFT across the range trans-formed samples, also commonly referred to as Doppler FFT, yields speed information. The first and second FFTs yield a so-called 2D range-Doppler map comprising range and speed (FFT) bins. A third FFT involving phase information of signals of different antenna elements of an antenna array can yield additional spatial or angular information.

Since automated drive is continuously increasing, also requirements for angular resolution, azimuth but also elevation, are continuously increasing. This means that the number of receive channels in a radar system continuously increase. On the other side, the number of RF pins on a radar Monolithic Microwave Integrated Circuit (MMIC) is limited by the power dissipation and by the number of pins. Thus, automotive radars may combine or cascade more and more MMIC devices to handle increasing numbers of receive channels.

Thus, there is a demand for improved signal processing concepts when using multiple cascaded MMIC devices in a radar system.

SUMMARY

This demand is met by radar devices and methods in accordance with the independent claims. Some beneficial embodiments are addressed by the dependent claims.

According to a first aspect, the present disclosure proposes a radar device. The radar device includes a first radar-IC configured to process first receive signals from first antennas of an antenna array. The first radar-IC is configured to determine a first range-Doppler map based on the first receive signals and to determine a first subregion of the first range-Doppler map based on criteria of interest. The radar device further includes at least a second radar-IC configured to process second receive signals from second antennas of the antenna array. The second radar-IC is further configured to determine a second range-Doppler map based on the second receive signals and to determine a second subregion of the second range-Doppler map based on the criteria of interest. A data interface is configured to forward information indicative of the first and/or the second subregions to a common processor for further processing. In some embodiments, the data interface couples the first radar-IC with the second radar-IC. Additionally, or alternatively, the data interface couples the first radar-IC and/or the second radar-IC with an external processor.

For example, a radar-IC may be a stand-alone processor or a MMIC with integrated processing. In some embodiments, the antenna array may be a linear receive antenna array in one dimension, such as azimuth or elevation. Thus, the first antennas may be regarded as a first sub-array and the second antennas may be regarded as a second sub-array of the same linear receive antenna array.

Thus, the present disclosure proposes a distributed signal processing of first and second receive signals of a common antenna array. The first receive signals are processed by the first radar IC, while the second signals are processed by the second radar IC to obtain respective range-Doppler maps. While the first and second radar ICs compute their respective 2D range-Doppler maps and the subregions of interest independently, the spatial or angular information inherent in the receive signals of the antenna array cannot be estimated independently since information indicative of phases of both the first and the second receive signals (phase progression across the first and second antennas of the antenna array) is required. Instead of exchanging raw receive data via the data interface, the present disclosure proposes to compute respective 2D range-Doppler maps in the first and second radar-ICs independently, to detect first and second subregions of interest based on coherent integration or non-coherent integration of the respective range-Doppler maps, and to then exchange information indicative of the detected first and second range-Doppler map subregions of interest together with phase information for further (for example, external) spatial or angular processing. In this way, an amount of data that is shared over the data interface can be significantly reduced. The skilled person having benefit from the present disclosure will appreciate that the prosed distributed signal processing concept is not restricted to two radar-ICs but can be extended to any number.

In some embodiments, the first radar-IC is configured to determine the first range-Doppler map by combining range-Doppler maps of each of the first antennas of the antenna array, and the second radar-IC is configured to determine the second range-Doppler map by combining range-Doppler maps of each of the second antennas of the antenna array. That is, the first radar-IC can be configured to determine an antenna-specific range-Doppler map for each of the first receive signals. Each of the first receive signals stems from a different antenna of the first antennas. The first radar-IC can be configured to determine the first range-Doppler map based on a summation or integration of the antenna-specific range-Doppler maps of the first receive signals. The second radar-IC can be configured to determine an antenna-specific range-Doppler map for each of the second receive signals. Each of the second receive signals stems from a different antenna of the second antennas. The second radar-IC can be configured to determine the second range-Doppler map based on a summation or integration of the antenna-specific range-Doppler maps of the second receive signals.

In some embodiments, the criteria of interest based on which the first/second subregions are determined can include amplitude or energy levels associated with indices or FFT bins of the first/second range-Doppler maps above or below a predefined threshold, which can be adaptive. Thus, the first and second first subregions can include FFT bins (or indices thereof) of the first/second range-Doppler map matching the criteria of interest.

In some embodiments, the information indicative of the first and/or the second subregions includes binary information indicating FFT bins of the first and/or second subregions matching the criteria. In this way, an amount of information exchanged over the data interface can be kept low.

In some embodiments, the information indicative of the first and/or the second subregions further includes phase information associated with the first and/or second subregions matching the criteria. Phase information indicative of phase progression across all antennas is needed for angle estimation, which can be done using an FFT on the subregions matching the criteria across the antennas of the antenna array. In some embodiments, phase information associated with the first subregion can be derived from complex values of antenna-specific range-Doppler map bins matching the first subregion for each of the first antennas. Likewise, phase information associated with the detected second subregion can be derived from complex values of antenna-specific range-Doppler map bins matching the second subregion for each of the second antennas. In some embodiments, the phase information can correspond to a steering vector of the respective antennas at the respective subregions. The skilled person having benefit from the present disclosure will appreciate that a steering vector represents the set of phase delays a plane wave experiences, evaluated at a set of antenna array elements (antennas).

In some embodiments, the common processor is configured to combine the detected first and second subregions via a logic OR operation to obtain combined subregions as final detections. The combined subregions or final detections can then be forwarded to a remote processor unit, such as, for example, an Electronic Control Unit (ECU) of a vehicle. Additionally, phase information associated with the combined subregions can be forwarded to the remote processor unit to determine spatial directions of the final detections, for example by using an FFT on the final detections across the antennas of the antenna array. The phase information associated with the final detections can be collected from all radar-ICs by the common processor, for example the second radar-IC, and forwarded to the remote processor unit. Here, the common processor acts as a communication master. Alternatively, the phase information associated with the final detections can be communicated to the remote processor unit from the radar-ICs in a distributed manner.

In some embodiments, the common processor (for example, the second radar-IC) could also be configured to determine spatial directions of target objects based on the final detections and based on the phase information associated therewith itself. The final detections and their associated spatial directions could then be forwarded to the remote processor unit for further processing or displaying.

In some embodiments, where the second radar-IC acts as the common processor, the first radar-IC can be configured to forward information (for example, binary information) indicative of its detected first subregion to the second radar-IC via the data interface. The second radar-IC can be configured to combine the first and the second subregions to obtain combined subregions as final detections. This combination can be done via logical ORing the first and the second subregions or binary information thereof, for example. Additionally, the first radar-IC can be configured to forward phase (progression) information associated with its detected first subregion (or with a subregion which is in the final detections but not in the detected first subregion) to the second radar-IC via the data interface. With the additional phase (progression) information, the second radar-IC or another remote processor unit can determine spatial directions of target objects based on the final detections and based on the phase (progression) information associated therewith.

In some embodiments, the first radar-IC can be configured to forward information (for example, binary information) indicative of its detected first subregion to the second radar-IC via the data interface. The second radar-IC can be configured to combine the first and the second subregions to obtain combined subregions as final detections. This combination can be done via logical ORing the first and the second subregions or binary information thereof, for example. The first radar-IC can be configured to determine first spatial directions of first target objects based on a first subset of the combined subregions and based on associated first phase information across the first and second antennas. The first phase information is associated with the first subset of the combined subregions. The second radar-IC can be configured to determine second spatial directions of second target objects based on a second subset of combined subregions and based on associated second phase information across the first and second antenna. The second phase information is associated with the second subset of the combined subregions. In this way, load distribution also for calculating angular information among the radar-ICs may be achieved.

In some embodiments, the second radar-IC can be configured to select the first and second subsets of the combined subregions based on a selection criterion, such as a load balancing criterion. In other words, the second radar-IC computing the final detections may be configured to select which radar-IC shall compute spatial directions for which final detections (peaks). For this purpose, the second radar-IC may have access to processing load information related to each of the radar-ICs.

In some embodiments, a remote processor unit, such as an external ECU, may act as the common processor. Here, the first radar-IC can be configured to forward information (for example, binary information) indicative of its detected first subregion to the ECU directly or indirectly via the data interface. The second radar-IC can be configured to forward information (for example, binary information) indicative of its detected second subregion to the ECU directly or indirectly via the data interface. Here, "directly" may refer to a direct interface between the first/second radar-IC and the ECU. "Indirectly" may refer to a communication via an intermediate communication master. The external ECU can be configured to combine the first and the second subregions to obtain combined subregions as final detections. This combination can be done via logical ORing the first and the second subregions or binary information thereof, for example. Additionally, the first radar-IC can be configured to forward phase (progression) information associated with its detected first subregion (or with a subregion which is in the final detections but not in the detected first subregion) to the ECU directly or indirectly via the data interface. The second radar-IC can be configured to forward phase (progression) information associated with its detected second subregion (or with a subregion which is in the final detections but not in the detected second subregion) to the ECU directly or indirectly via the data interface. With the additional phase (progression) information, the ECU can determine spatial directions of target objects based on the final detections and based on the phase (progression) information associated therewith.

In some embodiments, the radar device can be configured to synchronize signal processing of the first and second radar-ICs using a common synchronization signal. This common synchronization signal can be based on a local oscillator (LO) signal of a master device, which can, for example, either be the first or the second radar-IC. Thus, in some embodiments, the common synchronization signal can be a FMCW LO signal of either the first or the second radar-IC.

In some embodiments, the data interface can be configured to forward the first and/or the second subregions as data compressed by a suitable data compression scheme.

According to a further aspect, the present disclosure proposes a method for detecting radar targets. The method includes: receiving, with a first radar-IC, a plurality of first receive signals from first antennas of an antenna array; determining, in the first radar-IC, a first range-Doppler map based on the first receive signals; determining, in the first radar-IC, a first subregion of the first range-Doppler map based on criteria of interest; receiving, with a second radar-IC, a plurality of second receive signals from second antennas of the antenna array; determining, in the second radar-IC, a second range-Doppler map based on the second receive signals; determining, in the second radar-IC, a second subregion of the second range-Doppler map based on the criteria of interest; and forwarding the first and/or the second subregion to a common processor for further processing via a data interface which may but need not couple the first and the second radar-IC.

In some embodiments, the first radar-IC can determine the first range-Doppler map by (coherently or non-coherently) combining range-Doppler maps of each of the first antennas of the antenna array, and the second radar-IC can determine the second range-Doppler map by (coherently or non-coherently) combining range-Doppler maps of each of the second antennas of the antenna array. That is, the first radar-IC can determine an antenna-specific range-Doppler map for each of the first receive signals. Each of the first receive signals stems from a different antenna of the first antennas. The first radar-IC can determine the first range-Doppler map based on a coherent or non-coherent summation/integration of the antenna-specific range-Doppler maps of the first receive signals. The second radar-IC can determine an antenna-specific range-Doppler map for each of the second receive signals. Each of the second receive signals stems from a different antenna of the second antennas. The second radar-IC can determine the second range-Doppler map based on a coherent or non-coherent summation/integration of the antenna-specific range-Doppler maps of the second receive signals.

In some embodiments, the common processor can combine the first and the second signal subregions via a logic OR to obtain combined subregions as final detections.

In some embodiments, the method can further include determining spatial directions of target objects based on the performing an FFT on the combined subregions across the both first and second antennas. For that purpose, phase (progression) information associated with the detected first and second subregions have to be shared among the radar-ICs.

In some embodiments, either the first or the second radar-IC includes the common processor.

Embodiments of the present disclosure can be used to reduce latency since no raw data has to be exchanged over the data interface. Instead, merely basic information on the selected range-Doppler map subregions is exchanged.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
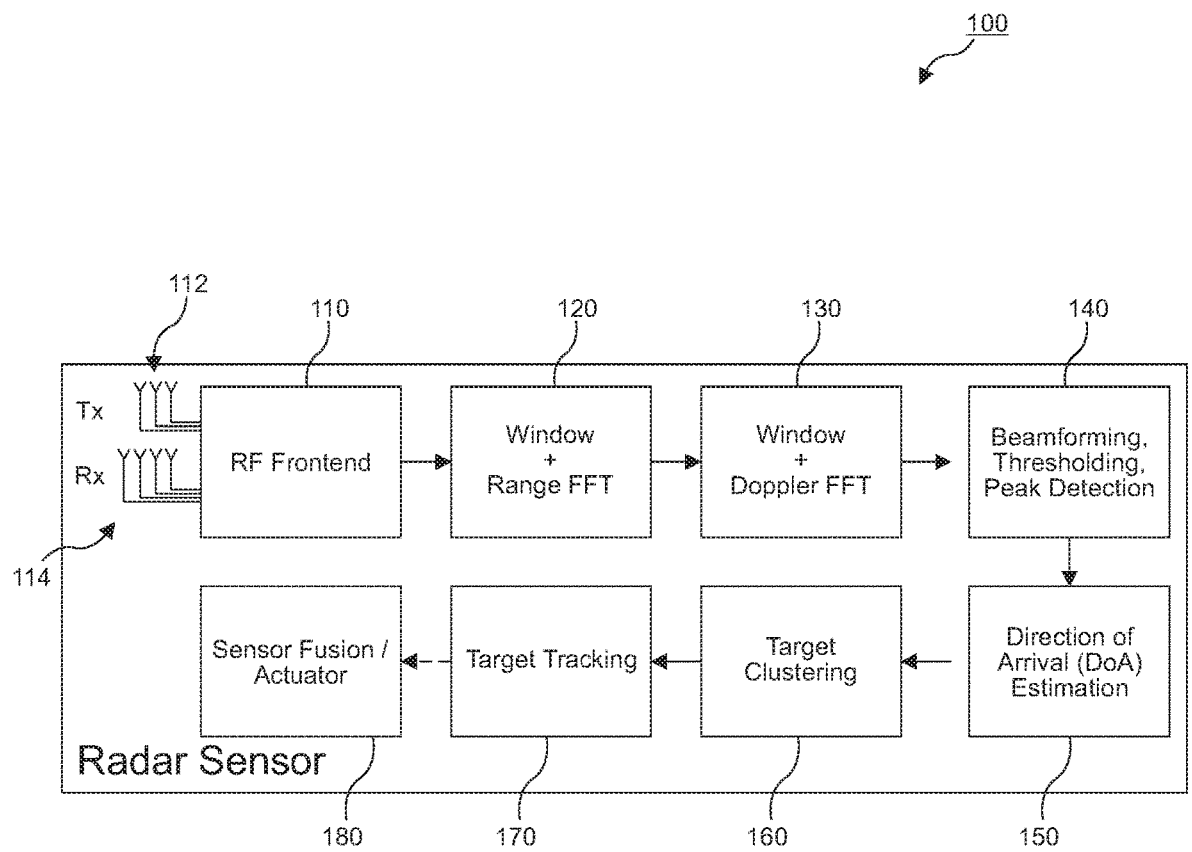
FIG. 1 shows a block diagram of a conventional radar signal processing chain.

FIG. 1 shows a block diagram of a conventional radar signal processing chain 100.

A Radio Frequency (RF) transceiver frontend 110 is used to generate transmit (Tx) radar signals that can be emitted via one or more transmit antennas 112. The radar signals can be in frequency bands ranging from 3 MHz to 300 GHz. Automotive radar systems typically operate at bands in 24 GHz and 77 GHz portions of the electromagnetic spectrum known as mm-wave frequencies so that adequate velocity and range resolution can be achieved. One or more receive (Rx) antennas 114 are used to receive electromagnetic waves (radar signals) reflected from targets. Radar operation involves range (distance), relative velocity, and possibly direction estimation. The latter can be done when using more than one receive antenna in an receive antenna array. Radar systems using both multiple transmit and multiple receive antennas are commonly referred to as MIMO radars. For proper transmit antenna spacing, the multiple-input multiple-output (MIMO) radar can emulate a larger aperture phased array radar. This larger array can be called a virtual array.

Figure 2:
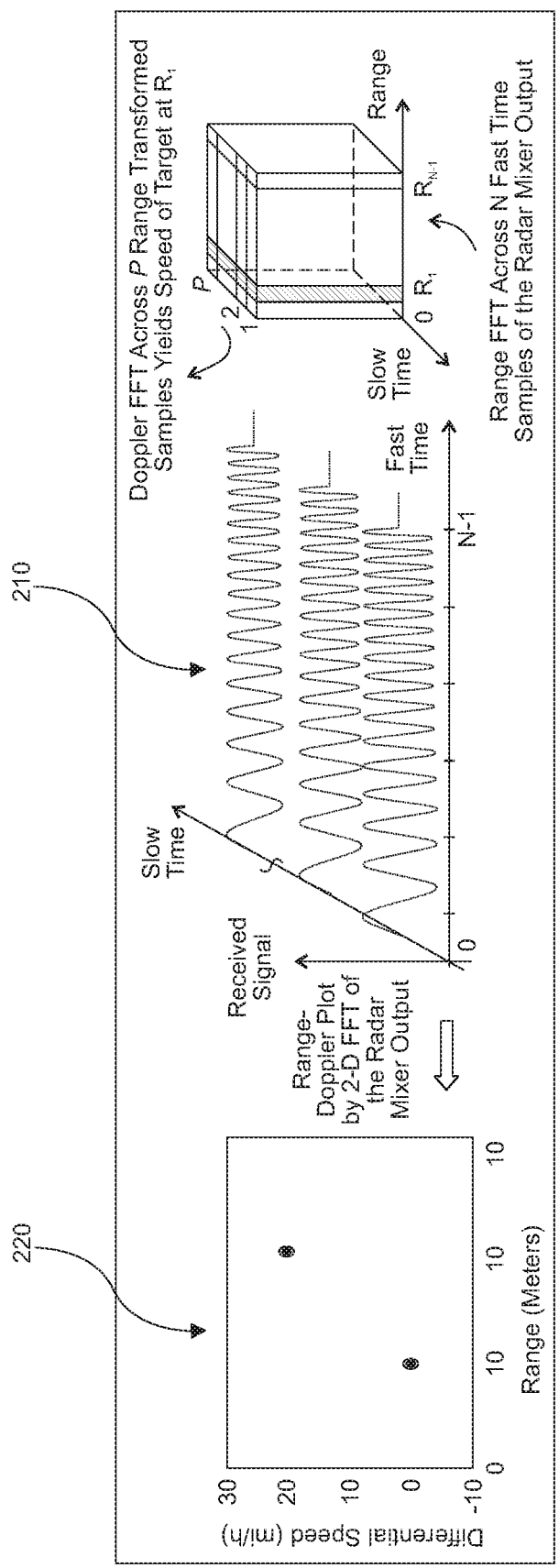
FIG. 2 shows a 2D joint range-Doppler estimation with FMCW radar.

A range processor 120 downstream from the RF transceiver frontend 110 is configured to perform range estimation. A range R to a target, can be determined based on the round-trip time delay that the electromagnetic waves take to propagate to and from that target: $R = (c\tau/2)$, where $\tau$ is the round-trip time delay in seconds and c is the speed of light in meters per second. Thus, the estimation of $\tau$ enables the range measurement. For example, pulse-modulated continuous waves (CWs) can comprise periodic and short power pulses and silent periods. Silent periods allow the radar to receive the reflected signals and serve as timing marks for radar to perform range estimation. With a pulsed radar configuration that uses frequency modulated (FM) CW pulses, simultaneous range-velocity estimation in multitarget traffic scenarios can be provided. A FMCW radar transmits periodic FM pulses (also referred to as chirps or ramps), whose frequency increases linearly during the pulse. The receive signal reflected from a target is conjugately mixed with the transmit signal to produce a low-frequency beat signal (also referred to as baseband signal), whose frequency gives the range of the target. This operation can be repeated for P consecutive FMCW pulses. Two-dimensional (2D) waveforms 210 in FIG. 2 depict successive reflected pulses arranged across two time indices p, n. The so-called slow time index p simply corresponds to the pulse number. On the other hand, the so-called fast time index n assumes that for each pulse, the corresponding continuous beat signal is sampled with frequency $f_s$ to collect N samples within a pulse duration T.

The range processor 120 can be configured to perform a first discrete Fourier transform (e.g., FFT) across the fast time n to obtain beat frequency $f_b$ coupled with Doppler frequency $f_d$. This operation is also commonly known as range transform or range gating, which allows the estimation of Doppler shift corresponding to unique range gate or bin by the application of second Fourier transform (e.g., FFT) across the slow time. This can be done by speed processing element 130. Thus, a range-Doppler map 220 can be generated by using a 2D FFT, see FIG. 2. An example range-Doppler map 220 illustrated in FIG. 2 shows two targets, a first one at 10 m distance and 0 miles/hour relative speed, and a second one at 20 m distance at 20 mi/h relative speed. The targets can be subregions of interest of the range-Doppler map.

So far, it has been assumed that automotive radars only receive the reflection from the targets of interest, such as vehicles traveling in front. However, in addition to direct reflections from a target of interest, the radar also receives reflections from the road debris, guard rails, and walls, for example. This unwanted return at the radar is typically called clutter. The amount of clutter in the system changes as the surrounding environment of the vehicle varies. Hence, adaptive algorithms such as constant false alarm rate (CFAR) processing and space-time adaptive processing (STAP) can be used to mitigate the effect of clutter. To identify valid targets in the presence of clutter, a threshold for the target detection should be properly chosen. If the amplitude of the range-Doppler map at an estimated range is greater than some threshold, for example, the target can be said to be detected. Thus, the threshold should depend on the noise (e.g. clutter) in the given system. As clutter increases, a higher threshold may be chosen. A simple CFAR method based on cell or bin averaging can use a sliding window to derive the local clutter level by averaging multiple range bins. This described threshold selection and target (peak) detection is performed in processing block 140.

The use of wideband pulses, such as FMCW pulses, provides discrimination of targets in both distance and velocity. The discrimination in direction can be made using a multi-antenna array, such as in multi-antenna radar systems. multi-antenna radar systems can employ multiple transmitters, multiple receivers, and multiple waveforms to exploit all available degrees of freedom. To spatially resolve targets and deliver comprehensive representation of the traffic scene, angular location of targets are estimated. Therefore, in automotive radars, the location of a target can be described in terms of a spherical coordinate system (R, θ, ρ), where (θ, ρ) denote azimuthal and elevation angles, respectively. A single antenna radar setup is sufficient to provide a range-velocity map but insufficient to provide angle information since the measured time delay lacks the information in terms of angular locations of the targets. To enable direction estimation, the radar is configured to receive reflected waves with multiple antennas. For example, locating a target using electromagnetic waves in two dimensions requires the reflected wave data from the object to be collected in two distinct dimensions. These distinct dimensions can be formed in many ways using combinations of time, frequency, and space across receive antennas. For instance, a linear receive antenna array 114 and wideband waveforms such as FMCW form two unique dimensions. Additionally, smaller wavelengths in mm-wave bands correspond to smaller aperture sizes and, thus, many antenna elements can be densely packed into an antenna array. Hence, the effective radiation beam, which is stronger and sharper, in turn increases the resolution of angular measurements.

Figure 3:
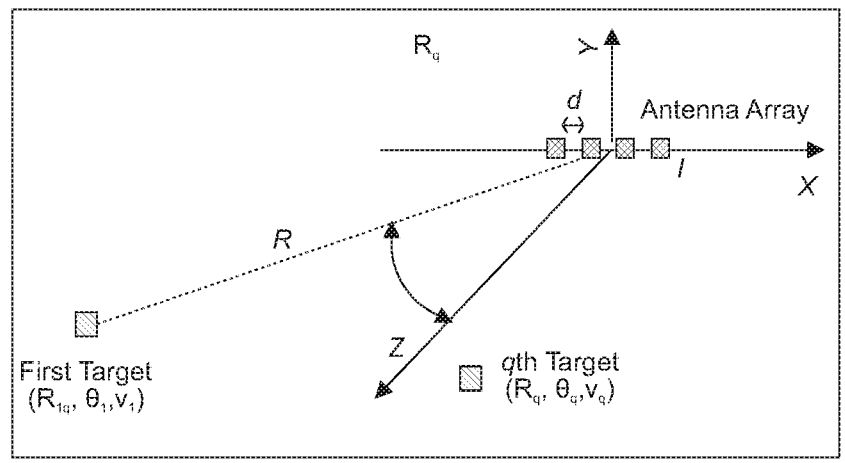
FIG. 3 illustrates azimuth angle estimation using a uniform linear antenna array.

Consider an antenna array located in plane z=0, and let l be the abscissa corresponding to each receiver antenna position, see FIG. 3. Let $(R_q, \theta_q)$ be the position of the q-th target in spherical coordinates, moving with velocity $v_q$ relative to the radar. With the help of far field approximation, for the q-th target, the round-trip time delay between a transmitter located at the origin and the receiver positioned at coordinate l is given by $$\tau_{l_q} = \frac{2(R_q + v_q l) + l d \sin\theta_q}{c}.$$

where d is the distance between antenna elements (usually half the wavelength) arranged in a linear constellation. The delay term $\tau_{l_q}$ creates uniform phase progression across antenna elements, which permits the estimation of the angle $\theta_q$ by FFT in spatial domain. Thus, 2D location (range and angle) and speed of targets can be estimated by a 3D FFT. The third angular FFT is performed in processing block 150 of the example radar signal processing block diagram of FIG. 1.

Further conventional automotive radar processing can include target clustering 160, target tracking 170, and optional sensor fusion 180 with sensor data of other environmental sensor types (e.g., camera, lidar, etc.).

As mentioned before, high-resolution radar systems (e.g. MIMO radar systems) use a plurality of transmit and/or receive channels. However, the number of possible transmit and receive channels of a single radar MMIC chip is limited. Therefore, several MMIC chips can be cascaded, i.e., several radar transceiver MIMIC chips can be coupled, wherein one of the MMIC chips can serve as a master and provide a system clock for clock synchronization, a trigger signal to provide a pulse start signal, and a high-frequency signal for phase synchronization, etc. The other MMIC chips (slaves) provide additional transmission/reception channels for the radar system. The present disclosure proposes an efficient concept for distributing radar signal processing among different radar MMIC chips for the discrimination of targets in distance, velocity, and direction.

Figure 4:
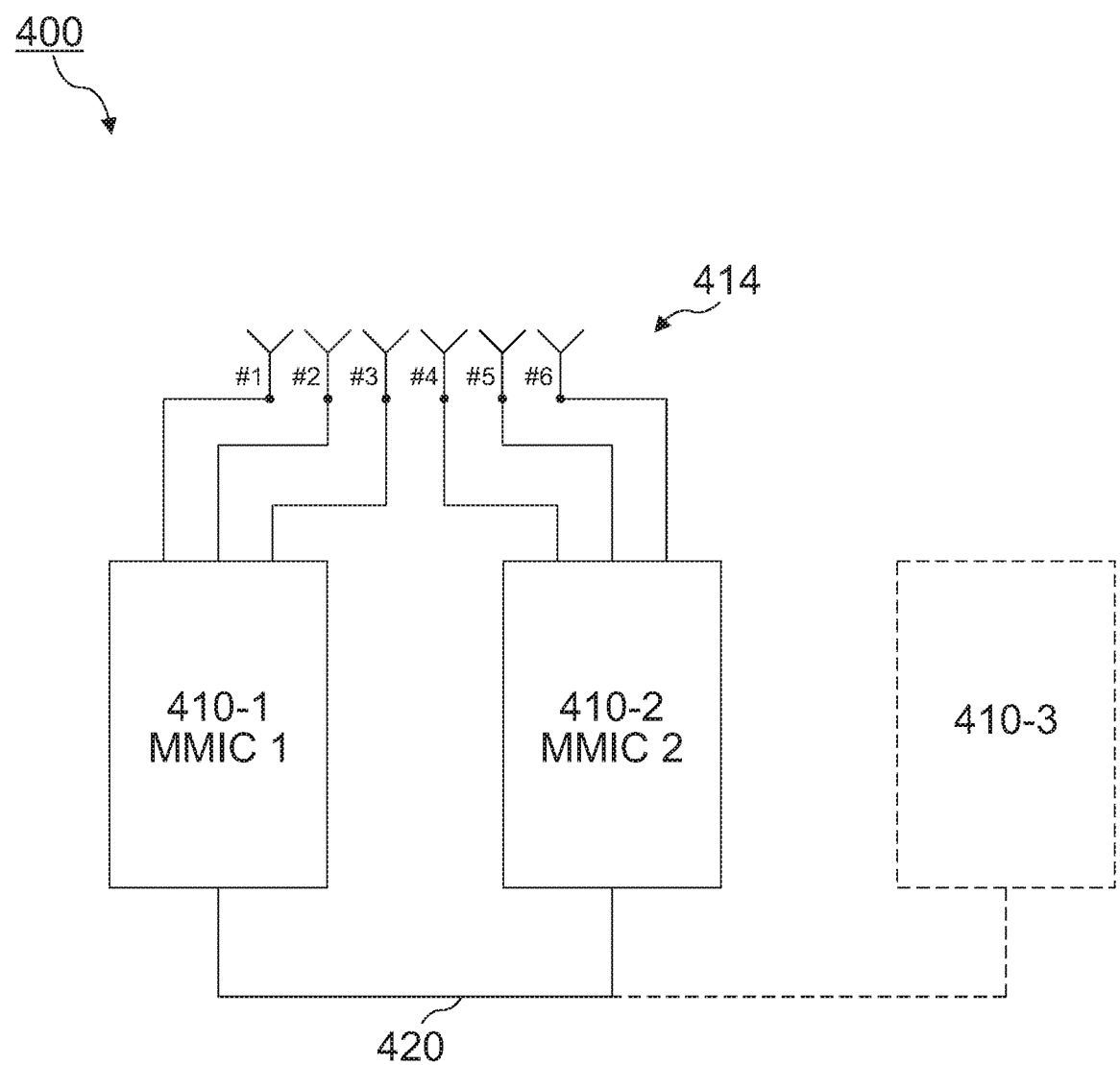
FIG. 4 shows a schematic block diagram of a radar device according to embodiments of the present disclosure.

FIG. 4 illustrates a basic setup of a radar device 400 in accordance with the present disclosure.

The radar device 400 includes a first radar-MMIC 410-1 and a second radar-MMIC 410-2. The first and second radar-MMICs 410-1, 410-2 can be cascaded. The radar-MMIC 410-1 may be coupled to first antennas (#1, #2, #3) of an antenna array 414, the second radar-MMIC 410-2 can be coupled to different second antennas (#4, #5, #6) of the same antenna array. The antenna array may be a linear antenna array, for example. The first radar-MMIC 410-1 is configured to process first receive signals from the first antennas (#1, #2, #3). In the illustrated example, the radar-MMIC 410-1 includes three receive chains. Each receive chain may include for example a low noise amplifier, a mixer and an analog-to-digital converter. The skilled person having benefit from the present disclosure will appreciate that the number of receive chains can be different and that radar-MMIC 410-1 may also include one or more transmitter chains with integrated power amplifier (PA), a synthesizer capable of delivering fast ramps for FMCW radar operation, integrated clock references and temperature sensors, for example. The first radar-MMIC 410-1 includes signal processing circuitry which is configured to determine a first range-Doppler map based on the (sampled) first receive signals and to determine a first subregion of the first range-Doppler map based on predetermined criteria. For example, the predetermined criteria can comprise amplitude or energy levels of range-Doppler map FFT bins above or below a predefined threshold. If the amplitude of the range-Doppler map at an estimated range/speed is greater than some threshold, for example, a peak of a first subregion of interest can be said to be detected. One or more such detected peaks can constitute a subregion of interest.

In some embodiments, the first radar-MMIC 410-1 is configured to determine an antenna-specific range-Doppler map for each of the first receive signals of the active receive channels corresponding to the first radar-MMIC 410-1. Each of the first receive signals stems from a different antenna of the first antennas (#1, #2, #3). Thus, the first radar-MMIC 410-1 is configured to determine, for each antenna (#1, #2, #3) associated with the first radar-MMIC 410-1, an antenna-specific range-Doppler map. The first radar-MMIC 410-1 is further configured to generate the first range-Doppler map based on a linear combination of the antenna specific range-Doppler maps, such as a coherent or non-coherent summation or integration of the antenna-specific range-Doppler maps of the first receive signals.

Likewise, the second radar-MMIC 410-2 is configured to process second receive signals from second antennas (#4, #5, #6) of the antenna array 414. In some implementations, the hardware of the second radar-MMIC 410-2 essentially corresponds to the first radar-MMIC 410-1. The second radar-MMIC 410-2 includes signal processing circuitry which is configured to determine a second range-Doppler map based on the (sampled) second receive signals and to determine a second subregion of the second range-Doppler map based on the criteria of interest. The second radar-MMIC 410-2 may perform the same range-Doppler processing as the first radar-MMIC 410-1 however utilizing the second receive signals instead of the first receive signals. For example, if the amplitude of the range-Doppler map at an estimated range/speed is greater than some threshold, a peak of a second subregion of interest is detected. Again, one or more of the detected peaks can constitute a subregion of interest.

In some embodiments, the second radar-MMIC 410-2 can be configured to determine an antenna-specific range-Doppler map for each of the second receive signals. Each of the second receive signals stems from a different antenna of the first antennas (#4, #5, #6). The second radar-MMIC 410-1 can be configured to determine the second range-Doppler map based on a linear combination such as a summation or integration of the antenna-specific range-Doppler maps of the second receive signals.

The radar device 400 further comprises a data interface 420 coupling the first radar-MMIC 410-1 with the second radar-MMIC 410-2. The data interface 420 is configured to forward information indicative of the detected first and/or the second range-Doppler map subregions to a common processor for further processing. In some implementations, the common processor can be a remote processor or MMIC 410-3 different from the first and the second radar-MMICs 410-1, 410-2. Alternatively, a processor implemented in one of the first and the second radar-MMICs 410-1, 410-2 can act as the common processor. In some implementations, the data interface 420 can be a unidirectional data interface. In some implementations, the data interface 420 can be based on the Serial Peripheral Interface (SPI) which is a synchronous serial communication interface. However, the skilled person having benefit from the present disclosure will appreciate that other implementations of high-speed inter-IC communication interfaces are possible as well.

In some implementations, cell or bin indices (p, n) of the detected first and/or second subregions can be forwarded to the common processor via the data interface 420. Bin indices of subregions of no interest (non-detected subregions) may be selected not to be forwarded to the common processor. In this way, communication bandwidth can be reduced and/or processing can be sped up, and the common processor may nonetheless reconstruct the detected subregions. Whether the first, the second or both detected subregions are selected to be forwarded via the data interface 420 depends on the implementation of the common processor. In some embodiments, it may be sufficient to only forward information related to the first detected subregion(s) to the second radar-MMIC 410-2 if the second radar-MMIC 410-2 acts as the common processor. Optionally, complex amplitude values associated with the bin indices of the detected first and/or second subregions can be additionally forwarded to the common processor via the data interface 420. This can be done across all antennas of the respective radar-MMIC such that a discrete Fourier transform (FFT) on the detected subregions can be performed at a later stage for angle estimation.

The common processor may be configured to combine the first and the second signal subregions, e.g. via a logic OR combination of the FFT bins, to obtain one or more combined subregions. For example, each of the FFT bins of the first subregion are represented in a first logical map as a logical value 1 while the FFT bins not within the first subregion are represented as a logical value 0. Similar, the FFT bins of the second subregion are represented in a second logical map as a logical value 1 while the FFT bins not within the second subregion are represented as a logical value 0. By an OR-combination of the logical values of the respective first and second logical maps for each FFT bin, a combined logical map may be obtained in which the combined subregions are represented by the resulting logical values 1. Based on the one or more combined subregions and additional phase information (across antennas) associated with the one or more combined subregions a third discrete Fourier transform across antennas for directional or angular processing can then be performed.

Figure 5:
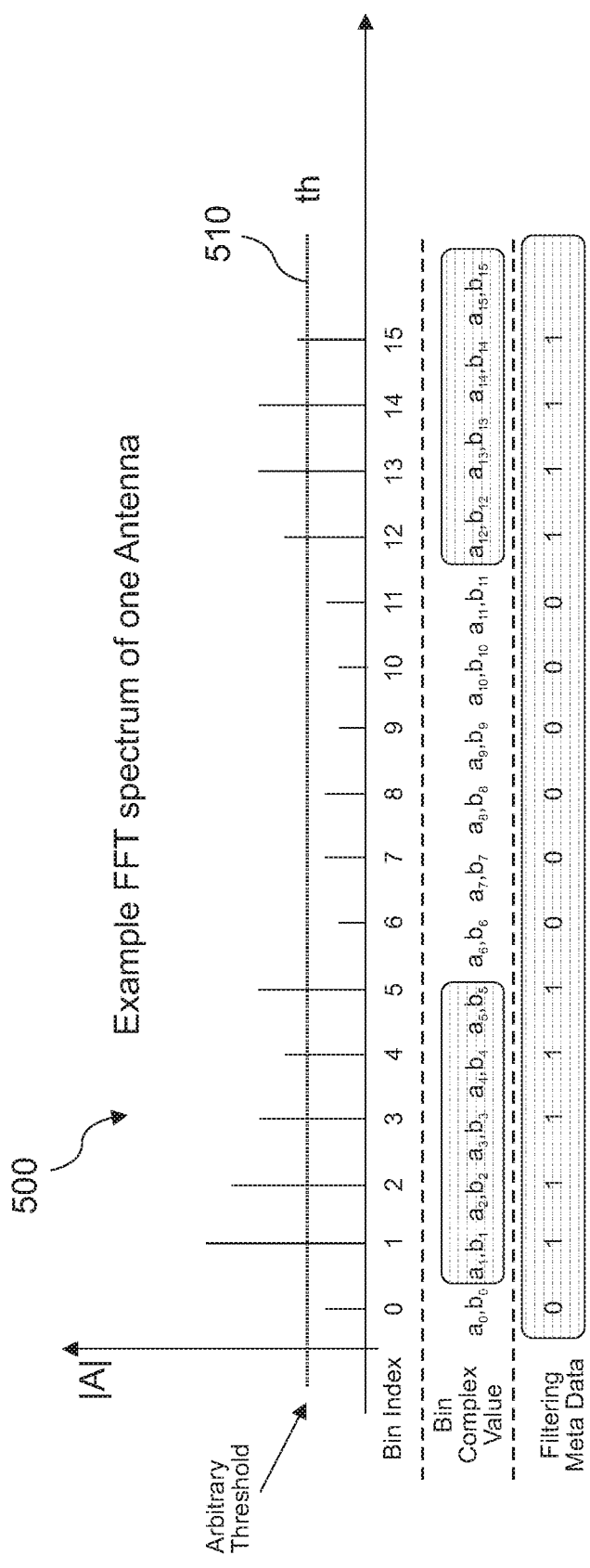
FIG. 5 shows an example of exchanged data.

An example of detected subregion data that can be exchanged via the data interface 420 is shown in FIG. 5.

FIG. 5 illustrates an example FFT spectrum 500 of one receive antenna with 16 FFT bins (from index 0 to 15). Each FFT bin i (i=0 . . . 15) has an associated complex value ($a_i$, $b_i$) and an amplitude $A_i$. The amplitude values $A_i$ are compared against a fixed or adaptive threshold value th. If $A_i$>th, the corresponding bin i is said to be detected or to belong to a subregion of interest. In the illustrated example, bins 1, 2, 3, 4, 5, 12, 13, 14, and 15 are detected and hence constitute a subregion of interest. A metadata vector (binary map) of length 16 can be forwarded indicating the detected bins 1, 2, 3, 4, 5, 12, 13, 14, and 15. Here, the metadata vector has "1" at positions 1, 2, 3, 4, 5, 12, 13, 14, and 15 and "0" otherwise. The "1" in the metadata vector indicate the subregion(s) of interest. Further, the complex values ($a_i$, $b_i$) associated with the detected bins 1, 2, 3, 4, 5, 12, 13, 14, and 15 can be forwarded via the data interface 420. The complex values associated with the non-detected bins 0, 6, 7, 8, 9, 10, and 11 need not be forwarded. According to the example of FIG. 5, only complex values ($a_i$, $b_i$) indicative of amplitude and phase of the detected bins are transmitted (per receive antenna), while the logical values (metadata) are transmitted for all bins. Since the complex values ($a_i$, $b_i$) include the respective phase of the receive signal, the illustrated data format example of FIG. 5 also inherently includes information indicative of phases or phase progressions of the first and/or the second receive signals, which can be used for obtaining spatial information on the subregion(s) of interest.

Multiple of such FFT spectra or range-Doppler maps, each associated with a respective receive antenna, can be coherently or non-coherently integrated in each of the first and second radar-MMICs 410-1, 410-2. Coherent integration is performed before amplitude detection and thus preserves phase information, while a non-coherent integration is performed after amplitude detection and thus lacks phase information. FIG. 5 could therefore also be thought of a FFT spectrum resulting from a coherent or non-coherent integration of multiple antenna-specific FFT spectra.

In some implementations, the second radar-MMIC 410-2 can be configured to implement the common processor. In such cases the first radar-MMIC 410-1 can be configured to forward information indicative of phases of the first receive signals (phase progression across antenna elements #1, #2, #3) to the radar-MMIC 410-2 via the data interface 420. As described above, such phase information can be inherent to complex values ($a_i$, $b_i$) associated with the detected bins/subregions. The complex values ($a_i$, $b_i$) of the detected FFT bins across all first antenna elements #1, #2, #3 can be used to perform the spatial or angle FFT. Then the second radar-MMIC 410-2 can be configured to determine spatial directions (e.g. azimuthal or elevation angles) of the detected subregions based on the combined detected subregions from the first and second radar-MMICs 410-1, 410-2 and based on the phases of the first and the second receive signals. Here, the complex values ($a_i$, $b_i$) of the detected FFT bins across all antenna elements #1, #2, #3, #4, #5, #6 can be used to perform the spatial or angle FFT. Thus, an FFT on the combined detected subregions across all antennas of the antenna array can be performed to estimate the angle(s).

Figure 6A:
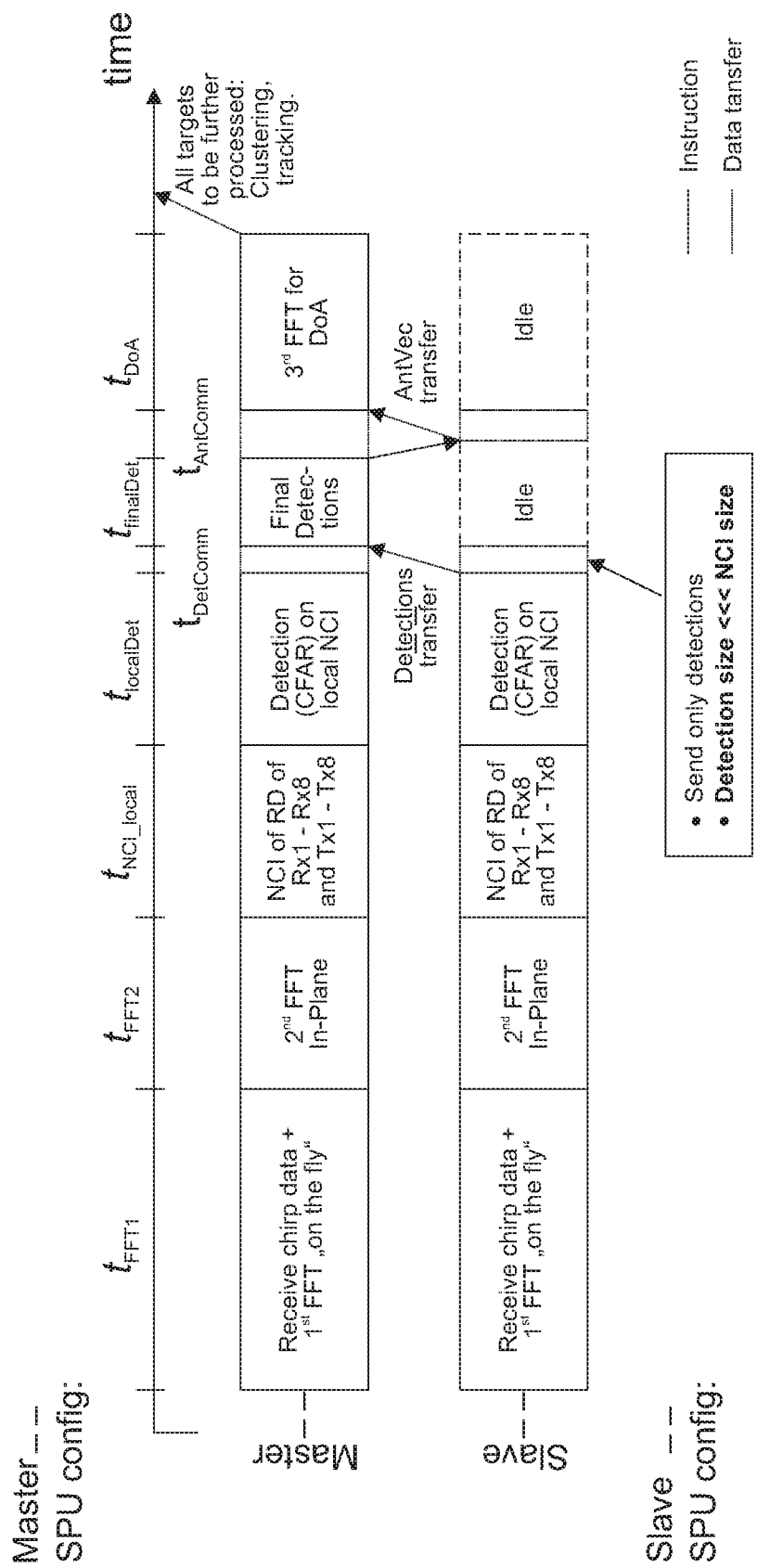
FIG. 6a shows an example signal flow in accordance with an example implementation.

An example signal flow in accordance with such implementations is shown in FIG. 6a.

FIG. 6a illustrates an example temporal signal processing course of the first and second radar-MMICs 410-1, 410-2. Here, the second radar-MMIC 410-2 acts as the master MMIC, while the first radar-MMIC 410-1 acts as the slave MMIC. The FMCW signal ramps are generated in the second radar-MMIC 410-2 and are distributed to the first radar-MMIC 410-1. Thus, both radar-MMICs 410-1, 410-2 use the same FMCW signal ramps for transmitting and receiving in a synchronized way.

During a first time-interval $t_{FFT1}$ both radar-MMICs 410-1, 410-2 perform a respective first FFT (range FFT) of respective (sampled) receive signals. This is done for each receive channel. During a subsequent second time-interval $t_{FFT2}$ both radar-MMICs 410-1, 410-2 perform a respective second FFT (Doppler FFT) across the slow time (subsequent pulses). Again, this is done for each receive channel. In this way range-Doppler maps for all respective receive channels can be obtained. When a target is illuminated by the radar beam it typically reflects numerous pulses. The probability of detection can be enhanced by summing or integrating all the range-Doppler map data of all Tx-Rx antenna pairs. In the illustrated example, each radar-MMIC 410-1, 410-2 is coupled to 8 receive antennas. Thus, a virtual antenna array of 8 transmit antennas and 16 receive antennas can be formed by using the radar-MMICs 410-1, 410-2. In the illustrated example, both radar-MMICs 410-1, 410-2 perform a non-coherent integration (NCI) of the range-Doppler maps for all respective receive- and transmit channels associated with the respective radar-MMIC during a subsequent time-interval $t_{NCI\_local}$. During a subsequent time-interval $t_{localDet}$, both radar-MMICs 410-1, 410-2 detect respective subregions of the respective integrated (NCI) range-Doppler map based on the criteria of interest and provide the logical representation whether an FFT bin is within a detected subregion or not. As mentioned before, the subregions can contain range-Doppler map bins associated with NCI amplitudes above a certain threshold, for example. In a subsequent short communication time-interval $t_{DetComm}$ the information of detected range-Doppler map subregions of the first radar-MMIC 410-1 are communicated to the second radar-MIMIC 410-2 via the data interface 420. This can be done in accordance with the example data format of FIG. 5, for example. The metadata vector and optionally the complex values $(a_i, b_i)$ (for all Tx-Rx antenna pairs of the first radar-MMIC 410-1) associated with the detected bins may thus be forwarded from the first radar-MMIC 410-1 to the second radar-MMIC 410-2 via the data interface 420. As described above, transmitted information related to the detected range-Doppler map subregions includes for each FFT bin within the subregion the amplitude and phase information and the 1-Bit information whether the FFT bin is within a subregion. For FFT bins which are not within the detected subregions, only the 1-Bit information whether the FFT bin is within a subregion may be transmitted. Note that an amount of data required to transfer the detected range-Doppler map subregions is much lower than transferring the range-Doppler map data of all antennas before NCI. During a subsequent time-interval $t_{finalDet}$ the second radar-MMIC 410-2 combines the detected range-Doppler map subregions of the first radar-MMIC and the detected range-Doppler map subregions of the second radar-MMIC via a logic OR to obtain combined detected subregions. During a subsequent short time-interval $t_{finalDet}$ the second radar-MMIC 410-2 may request, from the first radar-MMIC 410-1, additional phase information associated with combined detected subregions which were not within the previously detected range-Doppler map subregions of the first radar-MMIC. This additional phase information associated with the missing subregions may be forwarded from the first radar-MMIC 410-1 to the second radar-MMIC 410-2 via the data interface 420 in form of complex values $(a_i, b_i)$, for example. The requested additional phase information is then transferred from the first radar-MMIC 410-1 to the second radar-MMIC 410-2 during subsequent time-interval $t_{AntComm}$. Then the second radar-MMIC 410-2 has the information which allows generating the directional or angular information for the combined subregions via a third (angular) FFT across all antennas during time-interval $t_{DoA}$. Range information, speed information, and angular information of the detected (combined) subregions can then be forwarded to a remote processor, such as an ECU of a vehicle, for example. Another option would be to perform the third (angular) FFT at the external processor, such as the ECU.

Figure 6B:
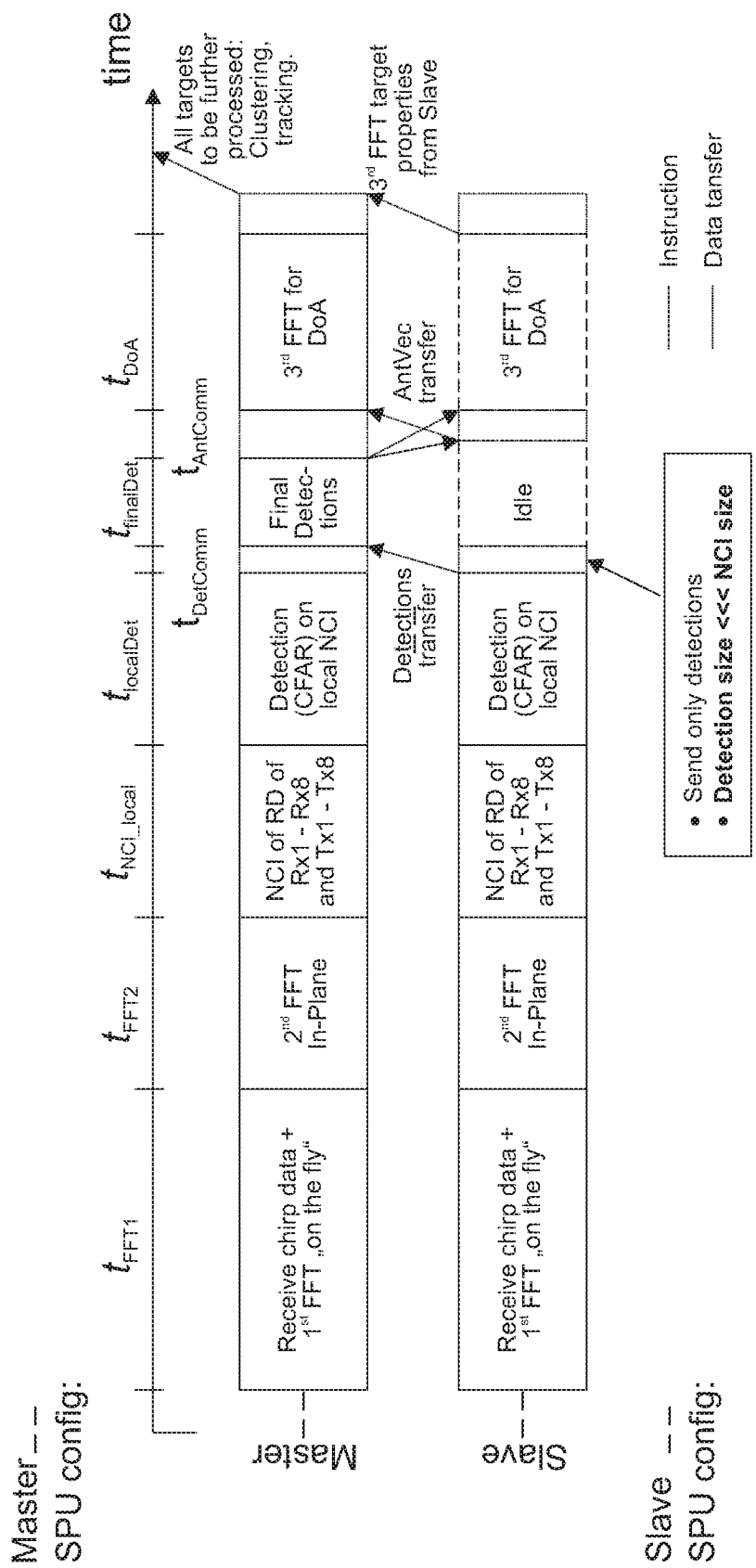
FIG. 6b shows an example signal flow in accordance with another example implementation.

The example temporal signal processing of FIG. 6b differs from FIG. 6a in that the third (angular) FFT is alternatively or additionally performed on the first radar-MMIC 410-1 during time-interval $t_{DoA}$. In FIG. 6b, the second radar-MMIC 410-2 is configured to forward the combined subregions and associated information indicative of phases of the second receive signals to the first radar-MMIC 410-1 via the data interface 420 during time-interval $t_{AntComm}$. Then, the first radar-MMIC 410-1 can determine the spatial directions of the combined subregions (target objects) based on an FFT on FFT bins of the combined subregions across the first and the second antennas.

Figure 7A:
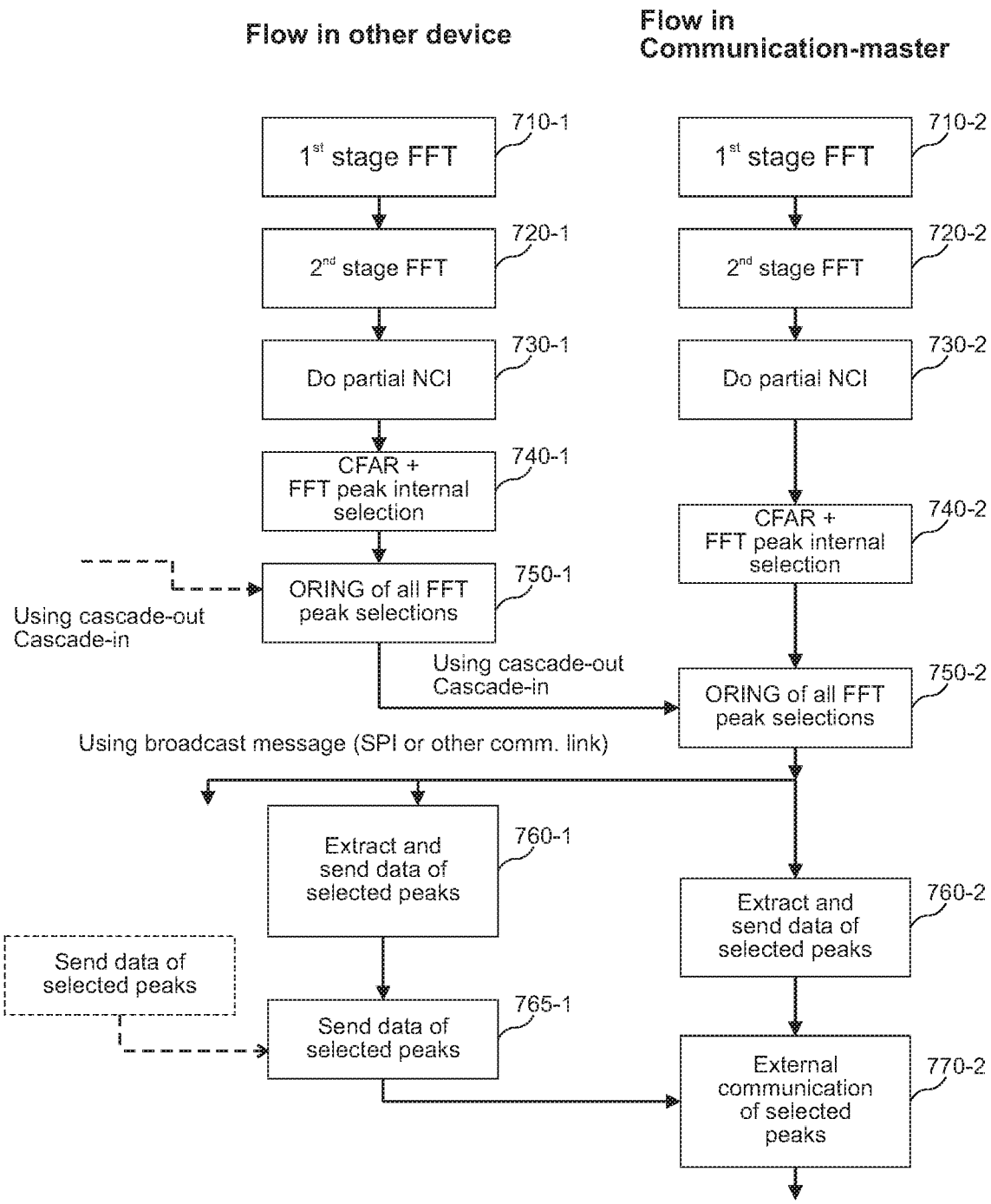
FIG. 7a shows a flowchart of distributed radar signal processing according to an embodiment.
Figure 7B:
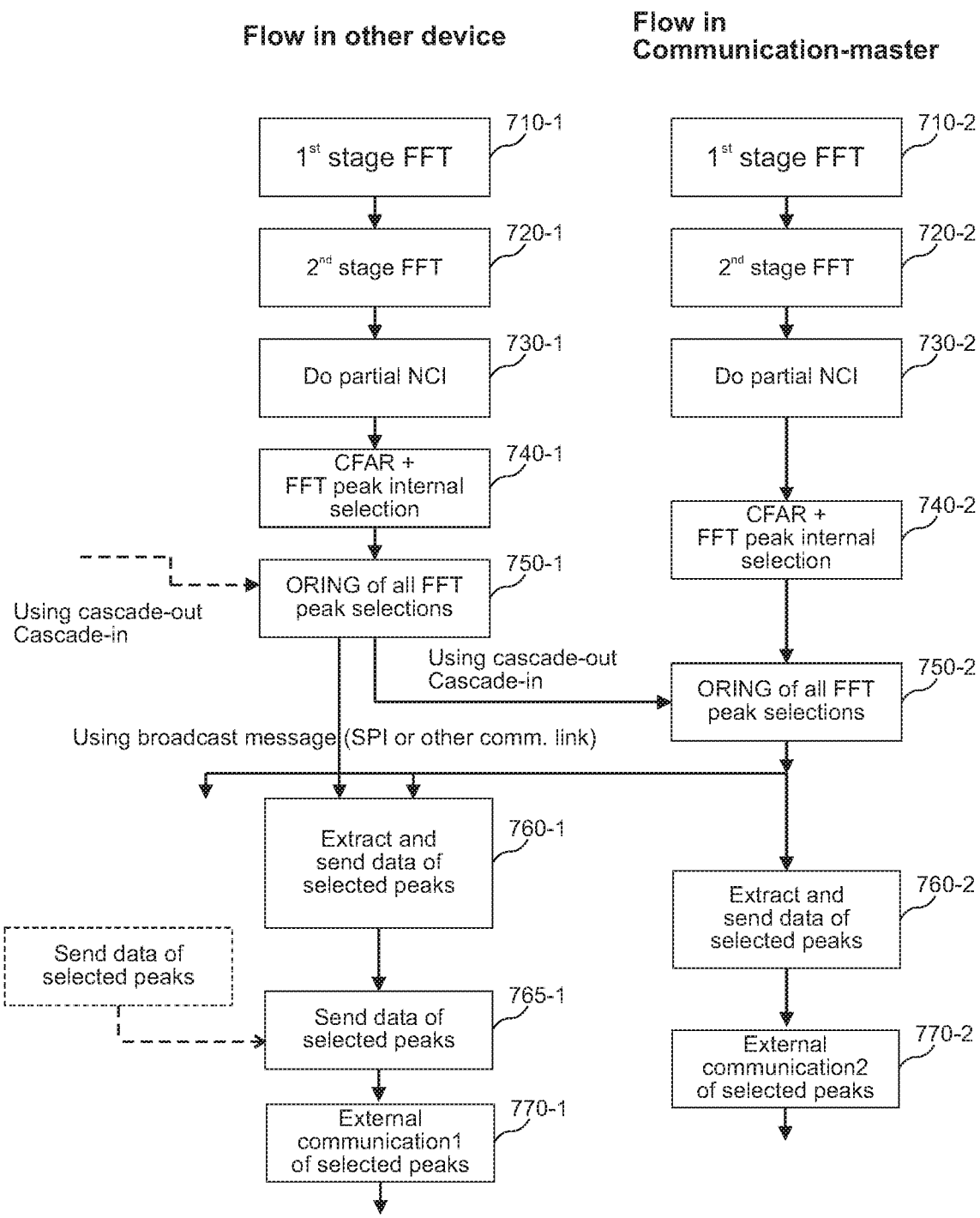
FIG. 7b shows a flowchart of distributed radar signal processing according to another embodiment.

FIGS. 7a and 7b illustrate flowcharts in accordance with the temporal signal processing courses of FIGS. 6a and 6b.

In FIGS. 7a and 7b the right column corresponds to acts performed in the master device (e.g. second radar-MMIC 410-2), while the left column corresponds to acts performed in the slave device (e.g. first radar-MMIC 410-1).

In respective first acts 710-1, 710-2 both radar-MMICs 410-1, 410-2 perform a respective first FFT (range FFT) of respective receive signals. This can be done for every receive channel. In subsequent second acts 720-1, 720-2 both radar-MMICs 410-1, 410-2 perform a respective second FFT (Doppler FFT) across the slow time. Again, this can be done for every receive channel. Thus, after the second acts 720-1, 720-2 receive-channel-specific range-Doppler maps are available in both radar-MMICs 410-1, 410-2. In subsequent third acts 730-1, 730-2 both radar-MMICs 410-1, 410-2 perform non-coherent integration (NCI) of their respective receive-channel-specific range-Doppler maps for all respective receive (and transmit) channels to obtain respective partially integrated (NCI) range-Doppler maps. In subsequent fourth acts 740-1, 740-2 both radar-MMICs 410-1, 410-2 detect respective subregions of the respective partially integrated (NCI) range-Doppler map based on the criteria of interest. The detected range-Doppler map subregions of the first radar-MMIC 410-1 are then communicated to the second radar-MMIC 410-2 via the data interface 420. As indicated in FIG. 7a, the detected range-Doppler map subregions of the first radar-MMIC 410-1 can already be combined (logical OR) with detected range-Doppler map subregions of another radar-MMIC (not shown). In this way, a cascade of various radar-MMICs can be implemented wherein each radar-MMIC detects respective subregions and forwards these to the next radar-MMIC of the cascade. A binary map (0 and 1s indicating the respective subregions) can be provided from each MMIC to the next MIMIC in the cascade and each MMIC receiving the binary map can further combine the binary maps at 750-1. Finally, the communication master can generate a final binary map at 750-2 indicating the final detected subregion(s) by combining the received binary map with its own binary map. This information on the final detected subregions indicated by the final binary map may then be distributed to each of the MMICs with a request to extract and send the related phase information (and amplitude information) to the communication master at 765-1. The communication master may then either calculate the angular FFT or send the data to an external ECU for calculating the angular FFT at 770-2.

In the flowchart of FIG. 7b, the information on the final detected subregions indicated by the final binary map is distributed to each of the MMICs with a request to extract and send the related phase information (and amplitude information). FIG. 7b differs from FIG. 7a in that the individual MMICs do not send the related phase information (phase progression across antennas) to the communication master but to an external ECU, for example. The ECU may then calculate the angular FFT based on the information received from the MMICs. The second radar-MMIC 410-2 may then either calculate the angular FFT or send the data to an external ECU for calculating the angular FFT at 770-2. Likewise, the first radar-MMIC 410-1 may then either calculate the angular FFT or send the data to an external ECU for calculating the angular FFT at 770-1.

Figure 7C:
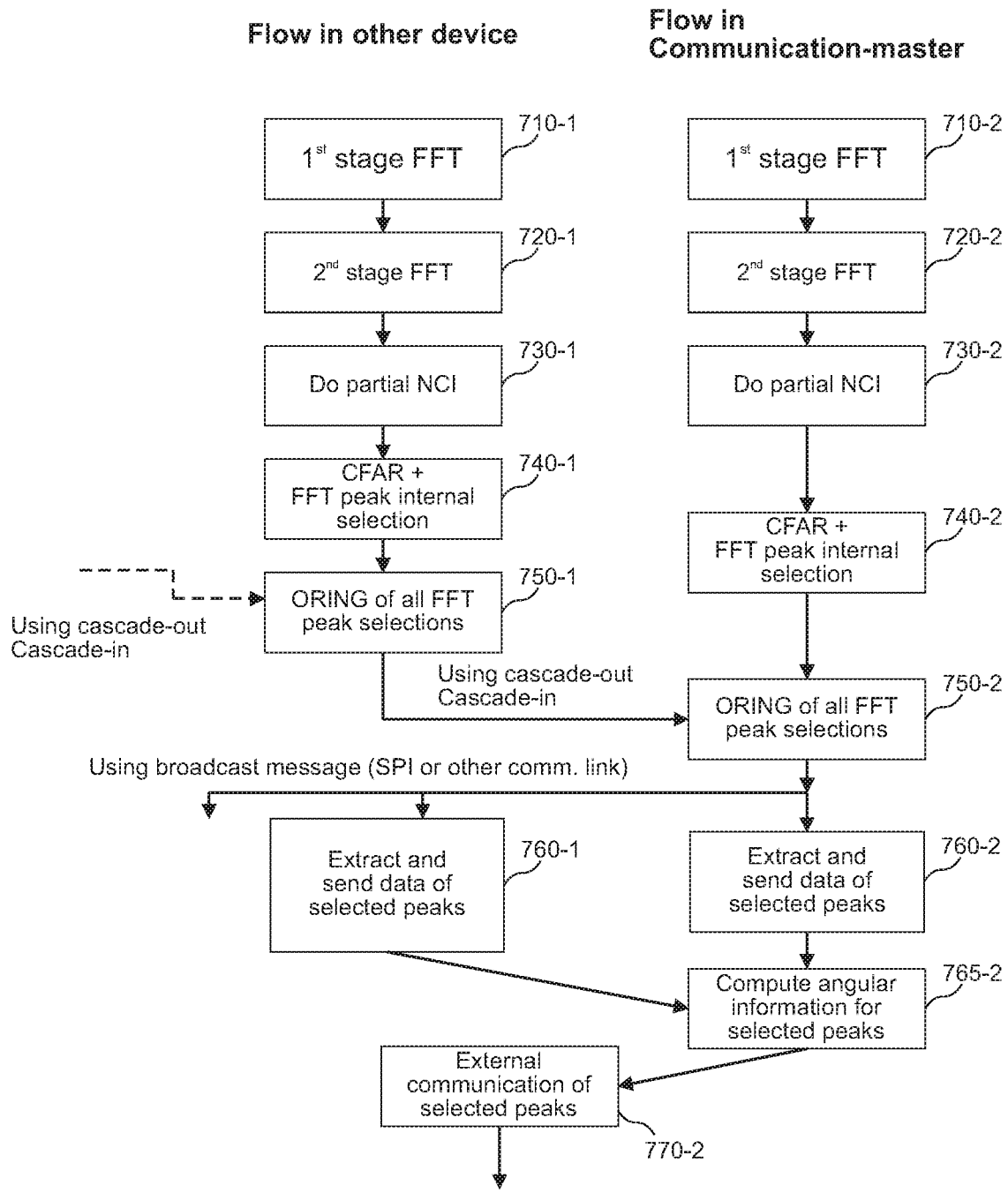
FIG. 7c shows a flowchart of distributed radar signal processing according to further embodiment.
Figure 7D:
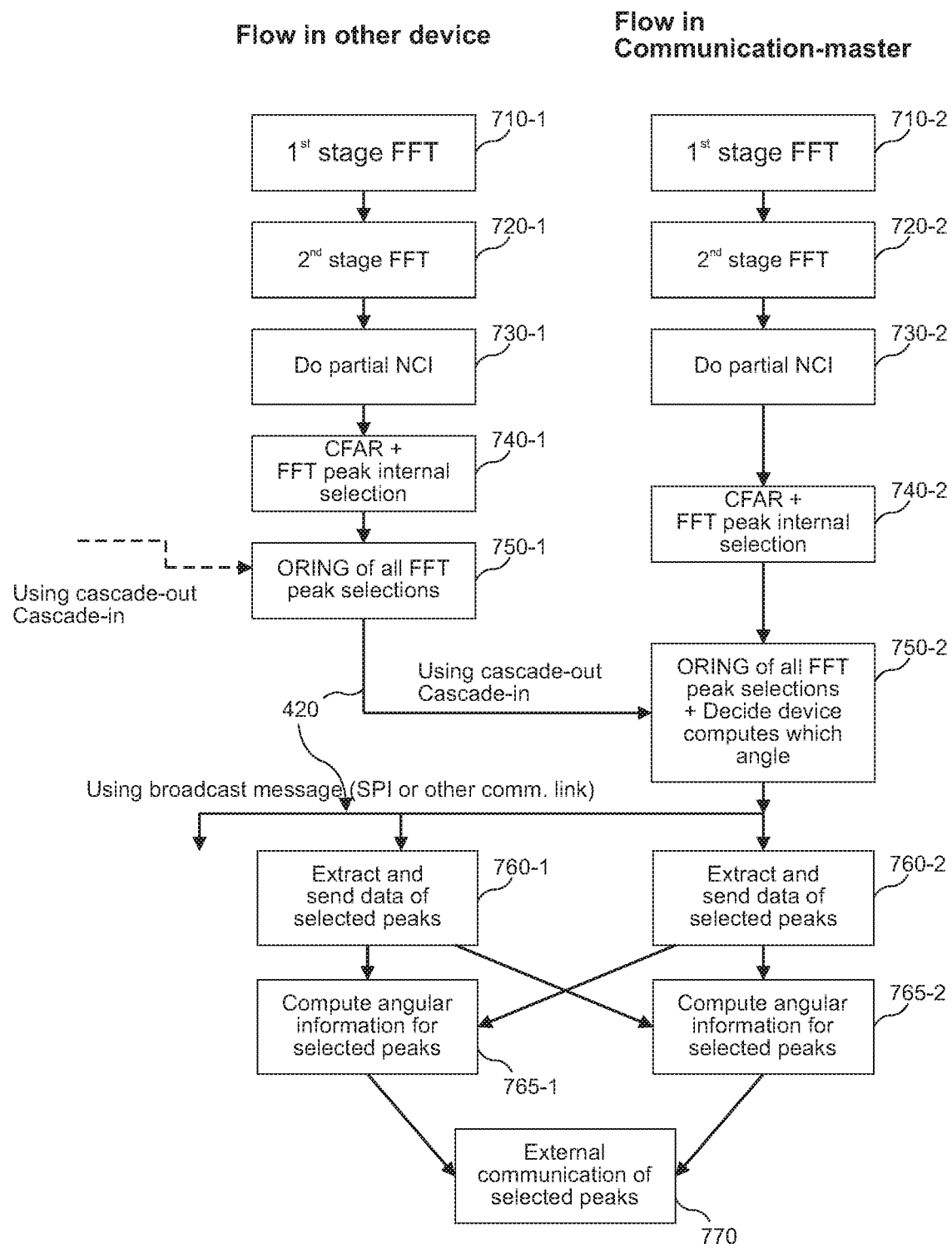
FIG. 7d shows a flowchart of distributed radar signal processing according to yet a further embodiment.

In act 765-1 of FIG. 7d, first angular information (via an angular FFT) is calculated for a first subset of the final detected subregions (peaks) by first radar-MMIC 410-1, while second radar-MMIC 410-2 may be selected to compute in act 765-2 second angular information (via an angular FFT) for a second subset of the final detected subregions (peaks). Likewise, a third radar-MMIC may be selected to compute third angular information for a third subset of the final detected subregions. The selection may be based on a selection criterion, such as a load balancing criterion, for example. The radar-MMICs can share phase information associated with the assigned subregions via the data interface 420. For example, phase information associated with the first subset of the final detected subregions can be provided to the first radar-MMIC 410-1 from second radar-MMIC 410-2 (and any further radar-MMICs) for computing the angular information in act 765-1 by the first radar-MMIC 410-1. Phase information associated with the second subset of the final detected subregions can be provided to the second radar-MMIC 410-2 from first radar-MMIC 410-1 (and any further radar-MMICs) for computing the angular information in act 765-2 by the second radar-MMIC 410-2, and so on. Information on the different subsets of final detected subregions (peaks) together with the related angular information obtained from acts 765-1, 765-2 may then be forwarded 770, to an external ECU via an Ethernet link, for example. Hence, the flowchart of FIG. 7d illustrates an embodiment with distributed angular processing among the different radar-MMICs 410-1, 410-2. The flowchart of FIG. 7c illustrates that phase information associated with the second subset of the final detected subregions can be provided to the second radar-MMIC 410-2 from first radar-MMIC 410-1 for computing the angular information in act 765-2. In FIG. 7c, the second radar-MMIC 410-2 also computes angular information corresponding to phase information associated with the first subset of the final detected subregions detected by the second radar-MMIC 410-2 in act 765-2. Information on the different subsets of final detected subregions (peaks) together with the related angular information obtained from act 765-2 may then be forwarded 770-2 to an external ECU via an Ethernet link, for example.

Figure 8A:
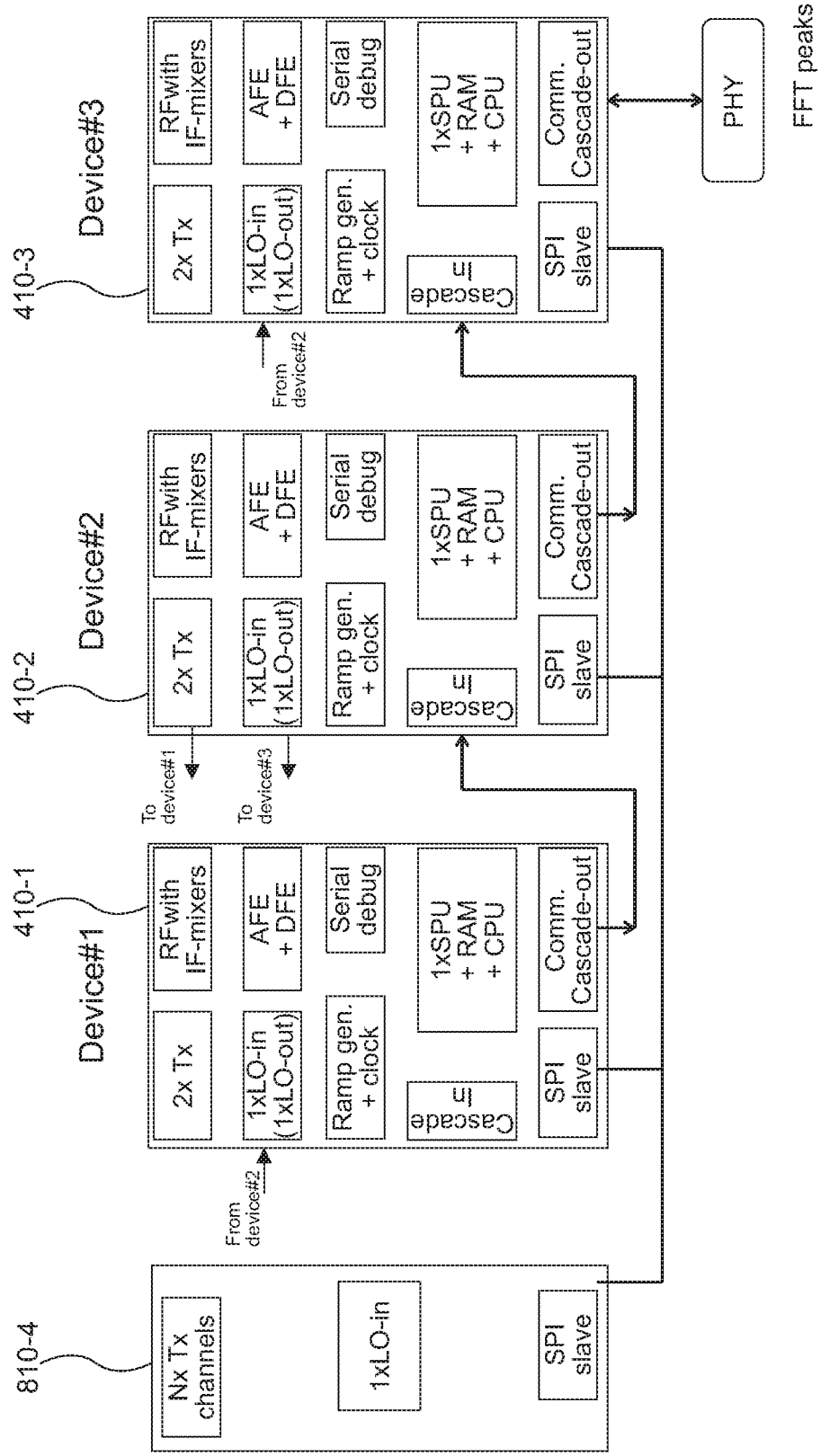
FIG. 8a shows a block diagram of distributed radar signal processing according to an embodiment.
Figure 8B:
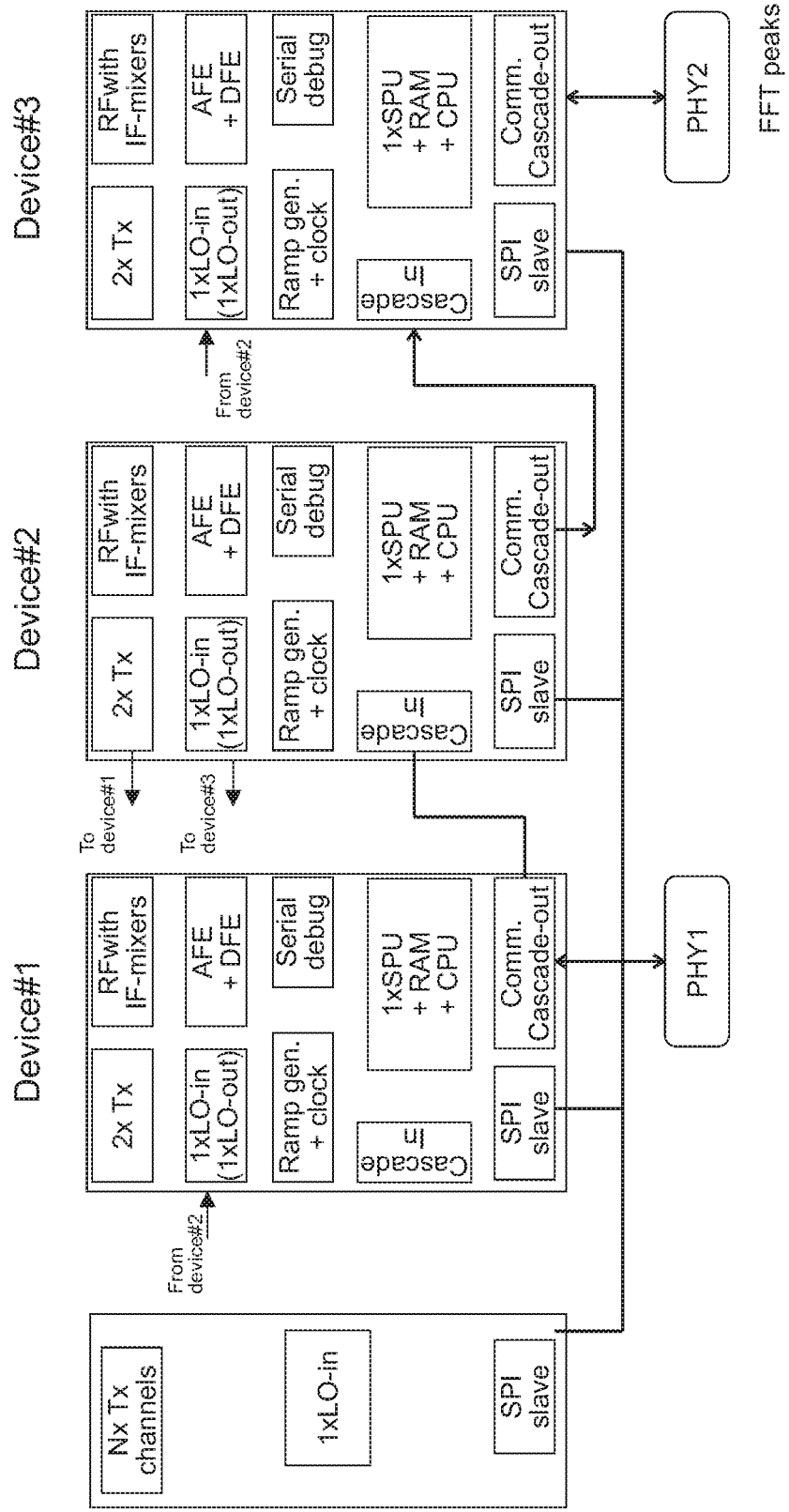
FIG. 8b shows a block diagram of distributed radar signal processing according to another embodiment.

Two example cascaded radar-MMIC layouts in accordance with embodiments of the present disclosure are shown in FIGS. 8a and 8b.

FIG. 8a shows an implementation with three radar-MMICs 410-1, 410-2, 410-3 acting as receiver ICs and another radar-MMIC 810-4 acting as transmitter IC. Each of the radar-MMICs 410-1, 410-2, 410-3 is connected to a subset of receive antennas of an receive antenna array (not shown). The radar-MMIC 810-4 is connected to transmit antennas of an transmit antenna array (not shown). The radar-MMIC 410-2 provides is local oscillator (LO) signal as synchronization signal to the other radar-MMICs 410-1, 410-3, and 810-4. All radar-MMICs 410-1, 410-2, 410-3, and 810-4 are connected via SPI. While radar-MMIC 410-3 acts as SPI master, the others act as SPI slaves. A communication cascade reaches from radar-MMIC 410-1 via radar-MIMIC 410-2 to radar-MMIC 410-3.

In one example implementation, the second radar-MMIC 410-2 can combine the detected range-Doppler map subregions (for example, the binary map thereof) received from the first radar-MMIC 410-1 with its own detected range-Doppler map subregions via a logic OR to obtain combined subregions and forward this result to the third radar-MMIC 410-3 for further combination with its own detected range-Doppler map subregions to obtain the complete detected subregions. This information on the final detected subregions indicated by the final binary map may then be distributed to each of the MMICs 410-1, 410-2 with a request to extract and send related phase information to the third radar-MMIC 410-3. The third radar-MMIC 410-3 may then either calculate the final angular FFT or send the data to an external ECU.

Alternatively, in a first round the binary maps of detected range-Doppler map subregions are transmitted along with the phase information for each detected range-Doppler map subregion. The second radar-MMIC 410-2 can combine the binary map received from the first radar-MMIC 410-1 with its own binary map via a logic OR to obtain combined subregions and forward this result to the third radar-MMIC 410-3 for further combination with its own binary map to obtain the final detected subregions. In a second round, each MMICs may provide additional phase information for those final detected subregions that were not among its own detected range-Doppler map subregions in the first round.

In the example of FIG. 8a, the MMICs are cascaded in a way such that no dedicated processing master exist. Each processing element processes data independently to identify the respective candidate FFT peaks (detected range-Doppler map subregions) to be sent to the central ECU. Each MMIC shares the respective list of candidate FFT peaks in order to generate a combined list of candidate peaks. Each of them sends its own FFT peaks and a list of FFT peaks found by the other processing element(s) in the radar. There is no master device but there could be only one device used to manage the external communication (so, sending the information describing FFT peaks). The cascading concept is based on a data cascading link to a device managing the communication (communication master) and a link used to send commands from the communication master to the other devices. The link is shown as SPI but can be of any other form (circular ring, . . . ).

FIG. 8b shows an implementation in line with the flowchart of FIG. 7b. Here, the individual MMICs do not send the phase information of the detected range-Doppler map subregions to a communication master but to an external ECU. The ECU may then calculate the angular FFT based on the information describing the detected range-Doppler map subregions received from the MMICs With the proposed concept latency can be reduced as interim results do not have to be passed to a master device to select which peak to send. A master device managing the communication can start sending the peaks it found as in case they have to be sent. The concept works the same when using compressed communication of range-Doppler map subregions or FFT peaks.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A radar device, comprising:
   a first radar-integrated circuit (IC) configured to process first receive signals from first antennas of an antenna array, wherein the first radar-IC is configured to generate a first range-Doppler map comprising a plurality of first FFT bins based on the first receive signals, and detect a first subregion within the first range-Doppler map corresponding to at least one first target object based on predetermined criteria, detect a second subregion within the first range-Doppler map that does not correspond to any target object based on the predetermined criteria, wherein the detected first subregion comprises a first portion of the plurality of first FFT bins and the detected second subregion comprises a second portion of the plurality of first FFT bins,
   wherein the first radar-IC is configured to generate a first binary map comprising a single bit value assigned to each FFT bin of the plurality of first FFT bins,
   wherein the first radar-IC is configured to assign a first bit value in the first binary map to each FFT bin of the first portion of the plurality of first FFT bins, and
   wherein the first radar-IC is configured to assign a second bit value in the first binary map to each FFT bin of the second portion of the plurality of first FFT bins;
   a second radar-IC configured to process second receive signals from second antennas of the antenna array, wherein the second radar-IC is configured to generate a second range-Doppler map comprising a plurality of second FFT bins based on the second receive signals, and detect a third subregion of the second range-Doppler map corresponding to at least one second target object based on the predetermined criteria, detect a fourth subregion within the second range-Doppler map that does not correspond to any target object based on the predetermined criteria, wherein the detected third subregion comprises a first portion of the plurality of second FFT bins and the detected fourth subregion comprises a second portion of the plurality of second FFT bins,
   wherein the second radar-IC is configured to generate a second binary map comprising a single bit value assigned to each FFT bin of the plurality of second FFT bins,
   wherein the second radar-IC is configured to assign the first bit value in the second binary map to each FFT bin of the first portion of the plurality of second FFT bins, and
   wherein the second radar-IC is configured to assign the second bit value in the second binary map to each FFT bin of the second portion of the plurality of second FFT bins; and
   a data interface configured to transmit at least one of the first binary map or the second binary map to a common processor for further processing.

2. The radar device of claim 1, wherein:
   the first radar-IC is configured to determine the first range-Doppler map by combining range-Doppler maps of each of the first antennas of the antenna array, and the second radar-IC is configured to determine the second range-Doppler map by combining range-Doppler maps of each of the second antennas of the antenna array.

3. The radar device of claim 1, wherein:
the first and the second range-Doppler maps comprise respective FFT bins,
the predetermined criteria comprise an FFT bin amplitude level above an adaptive threshold, and
the first and the third subregions comprise FFT bins of the respective range-Doppler map matching the predetermined criteria.

4. The radar device of claim 1, wherein the common processor is configured to determine spatial directions of target objects based on a combination of the first subregion and the third subregion and based on phase information associated therewith.

5. The radar device of claim 4, wherein the common processor is configured to transmit a combination of the first subregion and the third subregion and associated spatial directions to a central control unit.

6. The radar device of claim 1, wherein:
the second radar-IC comprises the common processor.

7. The radar device of claim 6, wherein:
the first radar-IC is configured to transmit phase information across the first antennas and associated with the first subregion to the second radar-IC via the data interface, and
the second radar-IC is configured to determine spatial directions of target objects based on a combined subregion of the first and the third subregions and based on associated phase information across the first antennas and the second antennas.

8. The radar device of claim 7, wherein the second radar-IC is configured to transmit the combined subregions and associated phase information across the first antennas and the second antennas to an external processor.

9. The radar device of claim 6, wherein:
the first radar-IC is configured to determine first spatial directions of the at least one first target object based on a first subset of a combined subregion of the first and the third subregions and based on associated first phase information acquired across the first antennas and the second antennas, and
the second radar-IC is configured to determine second spatial directions of at least one second target object based on a second subset of the combined subregion of the first and the third subregions and based on associated second phase information acquired across the first antennas and the second antennas.

10. The radar device of claim 9, wherein the second radar-IC is configured to select the first subset and the second subset of the combined subregion based on a selection criterion.

11. The radar device of claim 1, further comprising:
an external processor is-configured as the common processor,
the first radar-IC is configured to transmit the first binary map indicating the first subregion to the external processor via the data interface,
the second radar-IC is configured to transmit the second binary map indicating the third subregion to the external processor via the data interface, and
the external processor is configured to combine the first binary map and second binary map to obtain a combined binary map indicating combined subregions.

12. The radar device of claim 1, wherein the first radar-IC is configured to synchronize signal processing of the second radar-IC with signal processing of the first radar-IC using a common synchronization signal.

13. A method for detecting radar targets, the method comprising:
receiving, with a first radar-IC, a plurality of first receive signals from first antennas of an antenna array;
determining, by the first radar-IC, a first range-Doppler map comprising a plurality of first FFT bins based on the first receive signals;
detecting, by the first radar-IC, a first subregion within the first range-Doppler map corresponding to at least one first target object based on predetermined criteria;
detecting, by the first radar-IC, a second subregion within the first range-Doppler map that does not correspond to any target object based on the predetermined criteria, wherein the detected first subregion comprises a first portion of the plurality of first FFT bins and the detected second subregion comprises a second portion of the plurality of first FFT bins;
generating, by the first radar-IC, a first binary map comprising a single bit value assigned to each FFT bin of the plurality of first FFT bins, including assigning a first bit value in the first binary map to each FFT bin of the first portion of the plurality of first FFT bins, and assigning a second bit value in the first binary map to each FFT bin of the second portion of the plurality of first FFT bins;
receiving, with a second radar-IC, a plurality of second receive signals from second antennas of the antenna array;
determining, by the second radar-IC, a second range-Doppler map comprising a plurality of second FFT bins based on the second receive signals;
detecting, by the second radar-IC, a third subregion within the second range-Doppler map corresponding to at least one second target object based on the predetermined criteria;
detecting, by the second radar-IC, a fourth subregion within the second range-Doppler map that does not correspond to any target object based on the predetermined criteria, wherein the detected third subregion comprises a first portion of the plurality of second FFT bins and the detected fourth subregion comprises a second portion of the plurality of second FFT bins;
generating, by the second radar-IC, a second binary map comprising a single bit value assigned to each FFT bin of the plurality of second FFT bins, including assigning the first bit value in the second binary map to each FFT bin of the first portion of the plurality of second FFT bins, and assigning the second bit value in the second binary map to each FFT bin of the second portion of the plurality of second FFT bins
transmitting, via a data interface, at least one of the first binary map or the second binary map to a common processor for further processing.

14. The method of claim 13, wherein:
determining the first range-Doppler map comprises combining range-Doppler maps of each of the first antennas of the antenna array, and
determining the second range-Doppler map comprises combining range-Doppler maps of each of the second antennas of the antenna array.

15. The method of claim 13, further comprising:
combining the first subregion and the third subregion via a logic OR to obtain combined subregions.

16. The method of claim 15, further comprising:
determining spatial directions of target objects based on the combined subregions and based on phases of the plurality of first receive signals and the plurality of second receive signals associated with the combined subregions.

17. The method of claim 13, wherein either the first radar-IC or the second radar-IC comprises the common processor.

18. The radar device of claim 1, wherein the common processor is configured combine the first and the third subregions based on the first binary map and the second binary map to generate a combined subregion for FFT bins associated with at least one detected target object.

19. The radar device of claim 1, wherein the common processor is configured combine the first binary map and the second binary map to generate a combined binary map indicative of the first and the third subregions.

20. The radar device of claim 19, wherein:
the first radar-IC is configured to transmit phase information for each FFT bin of the first portion of the plurality of first FFT bins to the common processor, and
the second radar-IC is configured to transmit phase information for each FFT bin of the first portion of the plurality of second FFT bins to the common processor.

21. The radar device of claim 20, wherein the common processor is configured to generate directional information or angular information for the detected first subregion and the detected third subregion based on the combined binary map, based on the phase information for each FFT bin of the first portion of the plurality of first FFT bins, and based on the phase information for each FFT bin of the first portion of the plurality of second FFT bins.

22. The radar device of claim 21, wherein the common processor is configured request additional phase information from the second radar-IC associated with the combined binary map, and generate the directional information or the angular information for the detected first subregion and the detected third subregion based on the additional phase information.

23. The radar device of claim 1, wherein:
the first radar-IC is configured to transmit phase information for each FFT bin of the first portion of the plurality of first FFT bins to the common processor,
the second radar-IC is configured to transmit phase information for each FFT bin of the first portion of the plurality of second FFT bins to the common processor.

24. The radar device of claim 23, wherein the common processor is configured to generate directional information or angular information for the detected first subregion and the detected third subregion based on the phase information for each FFT bin of the first portion of the plurality of first FFT bins and based on the phase information for each FFT bin of the first portion of the plurality of second FFT bins.

25. The radar device of claim 23, wherein:
the first radar-IC is configured to withhold transmission of phase information for each FFT bin of the second portion of the plurality of first FFT bins to the common processor, and
the second radar-IC is configured to withhold transmission of phase information for each FFT bin of the second portion of the plurality of second FFT bins to the common processor.

26. The radar device of claim 1, wherein:
the first radar-IC is configured to transmit a complex value, indicative of an amplitude and a phase, for each FFT bin of the first portion of the plurality of first FFT bins to the common processor, and
the second radar-IC is configured to transmit a complex value, indicative of an amplitude and a phase, for each FFT bin of the first portion of the plurality of second FFT bins to the common processor.

27. The radar device of claim 26, wherein:
the common processor is configured combine the first and the third subregions based on the first binary map and the second binary map to generate a combined subregion for FFT bins associated with at least one detected target object, and
the common processor is configured to generate directional information or angular information for the combined subregion based on the complex values received from the first radar-IC and the second radar-IC.

28. The radar device of claim 1, wherein the first radar-IC and the second radar-IC are configured such that both the first binary map and the second binary map are processed in the common processor.

* * * * *